United States Patent
Furfori et al.

(10) Patent No.: US 10,773,208 B2
(45) Date of Patent: Sep. 15, 2020

(54) PROCESS FOR TREATING GASEOUS EFFLUENTS DEVELOPED IN COFFEE ROASTING INSTALLATION

(71) Applicant: LUIGI LAVAZZA S.p.A, Turin (IT)

(72) Inventors: Stefania Furfori, Turin (IT); Luciano Zattarin, Turin (IT); Fabio Alessandro Deorsola, Turin (IT); Samir Bensaid, Turin (IT); Nunzio Russo, Turin (IT); Debora Fino, Turin (IT); Raffaele Pirone, Turin (IT); Marco Piumetti, Cuneo (IT)

(73) Assignee: LUIGI LAVAZZA S.p.A, Turin (IT)

( * ) Notice: Subject to any disclaimer, the term of this patent is extended or adjusted under 35 U.S.C. 154(b) by 0 days.

(21) Appl. No.: 15/768,058

(22) PCT Filed: Oct. 14, 2016

(86) PCT No.: PCT/IB2016/056154
§ 371 (c)(1),
(2) Date: Apr. 13, 2018

(87) PCT Pub. No.: WO2017/064654
PCT Pub. Date: Apr. 20, 2017

(65) Prior Publication Data
US 2018/0304197 A1    Oct. 25, 2018

(30) Foreign Application Priority Data
Oct. 16, 2015 (IT) .................. 102015000062406

(51) Int. Cl.
*B01D 53/86* (2006.01)
*B01J 29/14* (2006.01)
(Continued)

(52) U.S. Cl.
CPC .............. *B01D 53/864* (2013.01); *A23F 5/04* (2013.01); *A23N 12/125* (2013.01); *B01J 29/14* (2013.01);
(Continued)

(58) Field of Classification Search
None
See application file for complete search history.

(56) References Cited

U.S. PATENT DOCUMENTS 3,691,099 A * 9/1972 Young .................... B01J 29/084
423/714
4,124,536 A   11/1978 Itoh et al.
(Continued)

FOREIGN PATENT DOCUMENTS

DE        741900 A      12/1955
EP    0 800 855 A1      10/1997
(Continued)

OTHER PUBLICATIONS

International Search Report for PCT/IB2016/056154, dated Feb. 8, 2017.

*Primary Examiner* — Anita Nassiri-Motlagh
(74) *Attorney, Agent, or Firm* — Sughrue Mion, PLLC

(57) ABSTRACT

A process for treating gaseous effluents developed in a coffee roasting installation making it possible to treat gaseous effluents developed in a coffee roasting installation, in which the effluents are passed through an oxidative catalytic converter. Within the catalytic converter use is made of a catalyst selected from the group including: a) a catalyst including a porous faujasite support containing copper oxide nanoparticles in a quantity of between 2% and 7% of the total weight of the catalyst; b) a catalyst including a porous γ-alumina support containing copper oxide nanoparticles in a quantity of between 2% and 7% of the total weight of the catalyst; and c) a catalyst including a mesoporous zeolite or (Continued)

Figure 1:
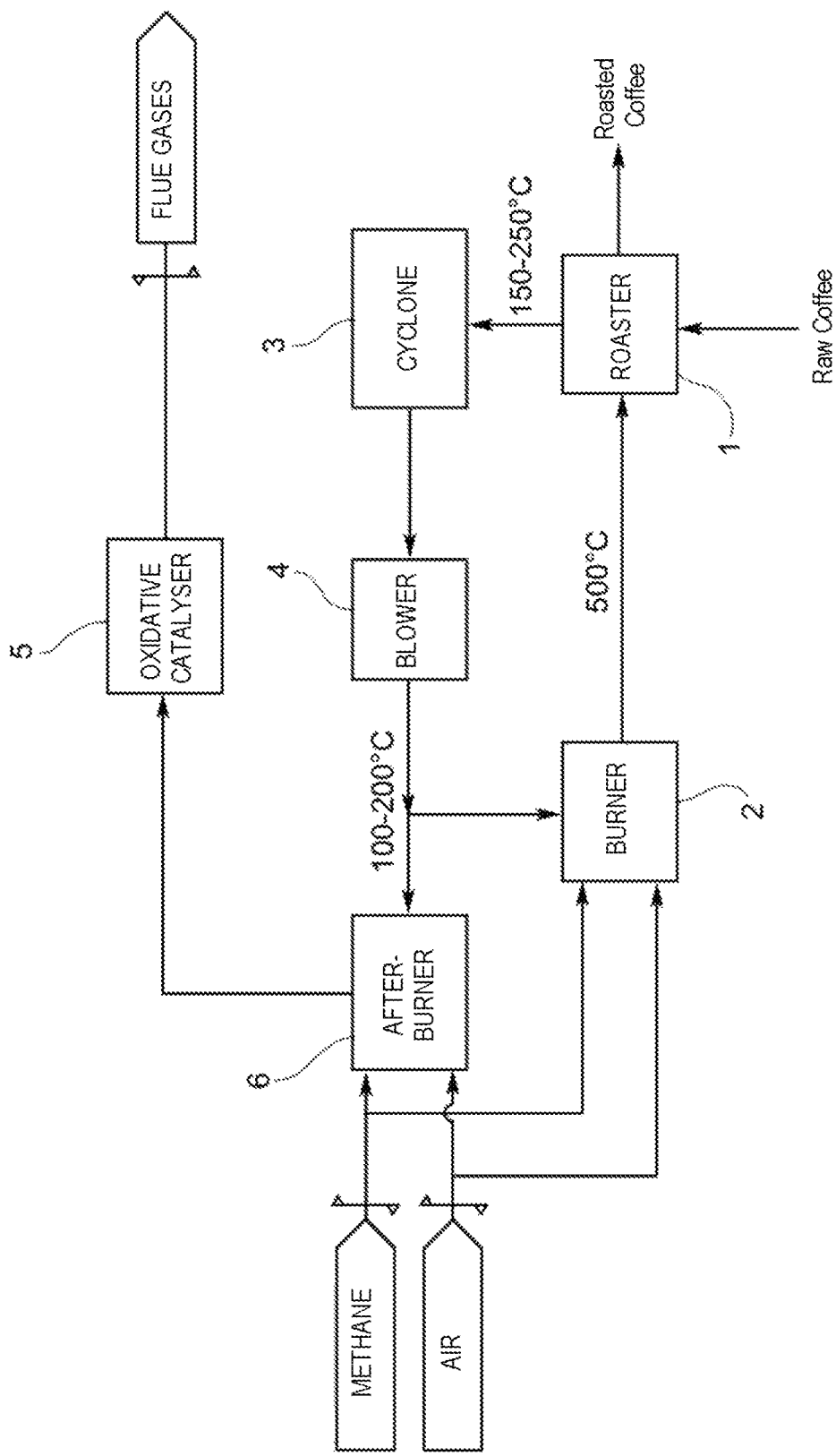

silica support containing iron nanoparticles in a quantity of between 2% and 7% of the total weight of the catalyst.

11 Claims, 4 Drawing Sheets

(51) Int. Cl.
*A23F 5/04* (2006.01)
*A23N 12/12* (2006.01)
*B82Y 30/00* (2011.01)

(52) U.S. Cl.
CPC ........... *B01D 2255/20738* (2013.01); *B01D 2255/20761* (2013.01); *B01D 2255/50* (2013.01); *B01D 2257/502* (2013.01); *B01D 2257/70* (2013.01); *B01D 2257/708* (2013.01); *B01D 2258/0275* (2013.01); *B82Y 30/00* (2013.01)

(56) References Cited

U.S. PATENT DOCUMENTS

| | | |
|---|---|---|
| 7,306,824 B1 | 12/2007 | Coker |
| 2006/0165853 A1 | 7/2006 | Ekanayake et al. |
| 2007/0286786 A1* | 12/2007 | Ikoma ................ B01J 29/26 |
| | | 423/239.2 |
| 2010/0304139 A1* | 12/2010 | Chang ................ C01B 37/005 |
| | | 428/402 |
| 2011/0092356 A1 | 4/2011 | Rollins et al. |
| 2011/0281720 A1 | 11/2011 | Andersen et al. |
| 2013/0072722 A1* | 3/2013 | Bishop .............. B01J 31/0254 |
| | | 564/417 |

FOREIGN PATENT DOCUMENTS

| | | |
|---|---|---|
| EP | 1 787 720 A1 | 5/2007 |
| WO | 2009/007246 A2 | 1/2009 |

* cited by examiner

* 280 ppm of pyridine produce 575 mg Nm⁻³ NOx

PROCESS FOR TREATING GASEOUS EFFLUENTS DEVELOPED IN COFFEE ROASTING INSTALLATION

CROSS REFERENCE TO RELATED APPLICATIONS

This application is a National Stage of International Application No. PCT/IM2016/056154 filed Oct. 14, 2016, claiming priority based on Italian Patent Application No. 102015000062406 filed Oct. 16, 2015.

BACKGROUND OF THE INVENTION

Field of the Invention

This invention relates to a process for treating gaseous effluents developed in a coffee roasting installation.

More specifically this invention relates to a process in which the said effluents are passed through an oxidative catalytic converter.

Background

The process of roasting raw coffee is associated with the development of volatile organic compounds (VOC) linked to the flavour of coffee. Many of these organic compounds which contain nitrogen atoms in their structure give rise to the formation of nitrogen oxides when passed through an oxidative catalytic converter typically used to comply with the regulations imposing limits on VOC and carbon monoxide (CO) emissions. These regulations require polluting compounds such as nitrogen oxides and organic compounds to be greatly reduced.

At the present time catalytic converters are an essential component of most exhaust systems, used particularly in the motor vehicle context to reduce emissions as a result of their ability to catalyse reactions that can convert the pollutants into harmless or not very harmful substances.

The post-treatment techniques for reducing $NO_x$ now established industrially are the SCR (Selective Catalytic Reduction) technique and the LNT (Lean $NO_x$ Trap) technique. In SCR the $NO_x$ molecules react with a reducing compound (generally ammonia or a precursor of it, for example urea) to form water and nitrogen in the presence of a catalyst in a temperature range between 300 and 400° C. The LNT technique on the other hand provides for trapping nitrogen oxides by adsorbing them in the form of nitrates onto a catalyst deposited on a solid support. Because the storage capacity of the adsorbent is limited, the trap has to be periodically regenerated through introducing a reducing substance for a very short time, thus giving rise to discontinuous functioning of the reduction system.

Both the techniques acting to reduce nitrogen oxides only require modifications to the layout of current installations through the addition of a further reactor and the possible addition of a reducing agent (typically ammonia), with consequent higher demands on the safety conditions for installations.

Further disadvantages associated with applying the two abovementioned techniques to the coffee roasting process lie mainly in use of the reducing agent, which may give rise to the possible release of the latter into the environment, with a consequent need to provide for an additional catalyst in order to remove it, the difficulty of correctly adding the reducing agent because of the extremely discontinuous nature of the roasting process, the presence of sulfur-containing compounds in the gaseous effluents requiring treatment, which can poison the catalyst and reduce its purifying ability, and the volumes of gaseous effluent, which can carry over appreciable volumes of catalyst thus requiring substantial modification of the layout of installations (particularly for the LNT technique).

In most cases converters comprise a ceramic substrate coated with a catalytic impregnating agent containing noble metals, nanoparticles of copper oxide, nanoparticles of iron oxide, and typically one or more metals of the platinum group (platinum, palladium, rhodium).

The extensive use of a large quantity of noble metals, nanoparticles of copper oxide and nanoparticles of iron oxide nevertheless gives rise to huge costs.

One object of this invention is to provide an improved process for treating the gaseous effluents developed in a coffee roasting installation, with the possibility of implementing the process using more economical materials having a great ability to oxidise nitrogen-containing molecules and volatile organic compounds.

SUMMARY OF THE INVENTION

These and other objects will be accomplished according to the invention through a treatment process of the type defined above, primarily characterised in that in the catalytic converter use is made of a catalyst selected from the group comprising:

a) a catalyst comprising a porous faujasite support containing copper (Cu) nanoparticles in a quantity of between 2% and 7%, and preferably around 5% of the total weight of the catalyst;

b) a catalyst comprising a porous γ-alumina (γ-$Al_2O_3$) support containing copper (Cu) nanoparticles in a quantity of between 2% and 7%, and preferably around 5% of the total weight of the catalyst; and c) a catalyst comprising a mesoporous zeolite or silica support containing iron (Fe) nanoparticles in quantities of between 2% and 7%, and preferably around 5% of the total weight of the catalyst.

The Cu or Fe nanoparticles may conveniently be deposited on corresponding supports using the IWI (Incipient Wetting Impregnation) technique.

In the case of catalysts containing iron nanoparticles, the aforementioned mesoporous zeolite or silica is conveniently a zeolite or SBA 15 (Santa Barbara Amorphous) silica.

Conveniently, although not necessarily, before the flue gases are passed into the catalytic converter the abovementioned gaseous effluents developed during the roasting of raw coffee are heated to a temperature of between 350° C. and 500° C., preferably between 400° C. and 450° C., for example using a post-combustion unit.

BRIEF DESCRIPTION OF THE INVENTION

Figure 2:
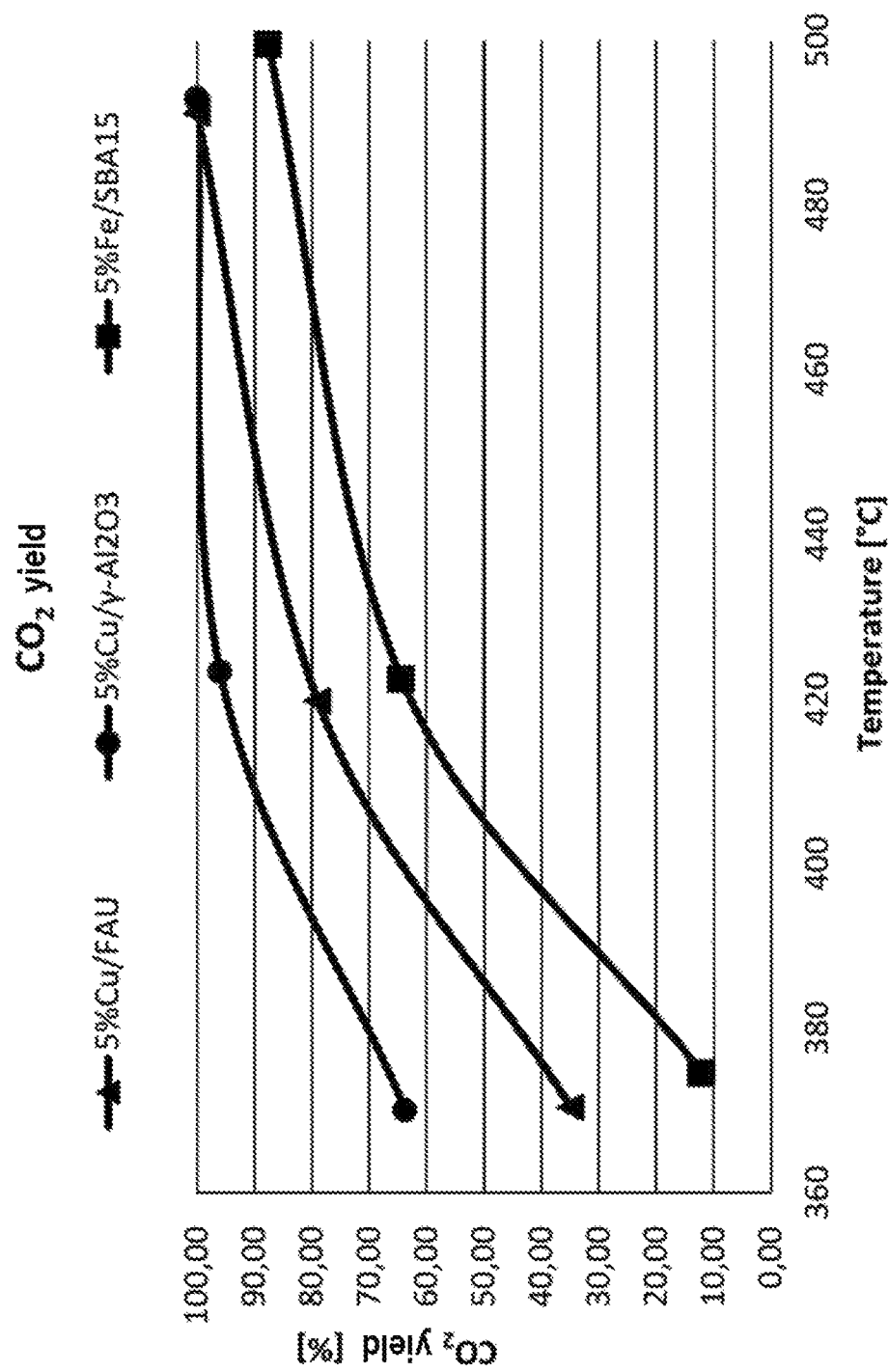
Figure 3:
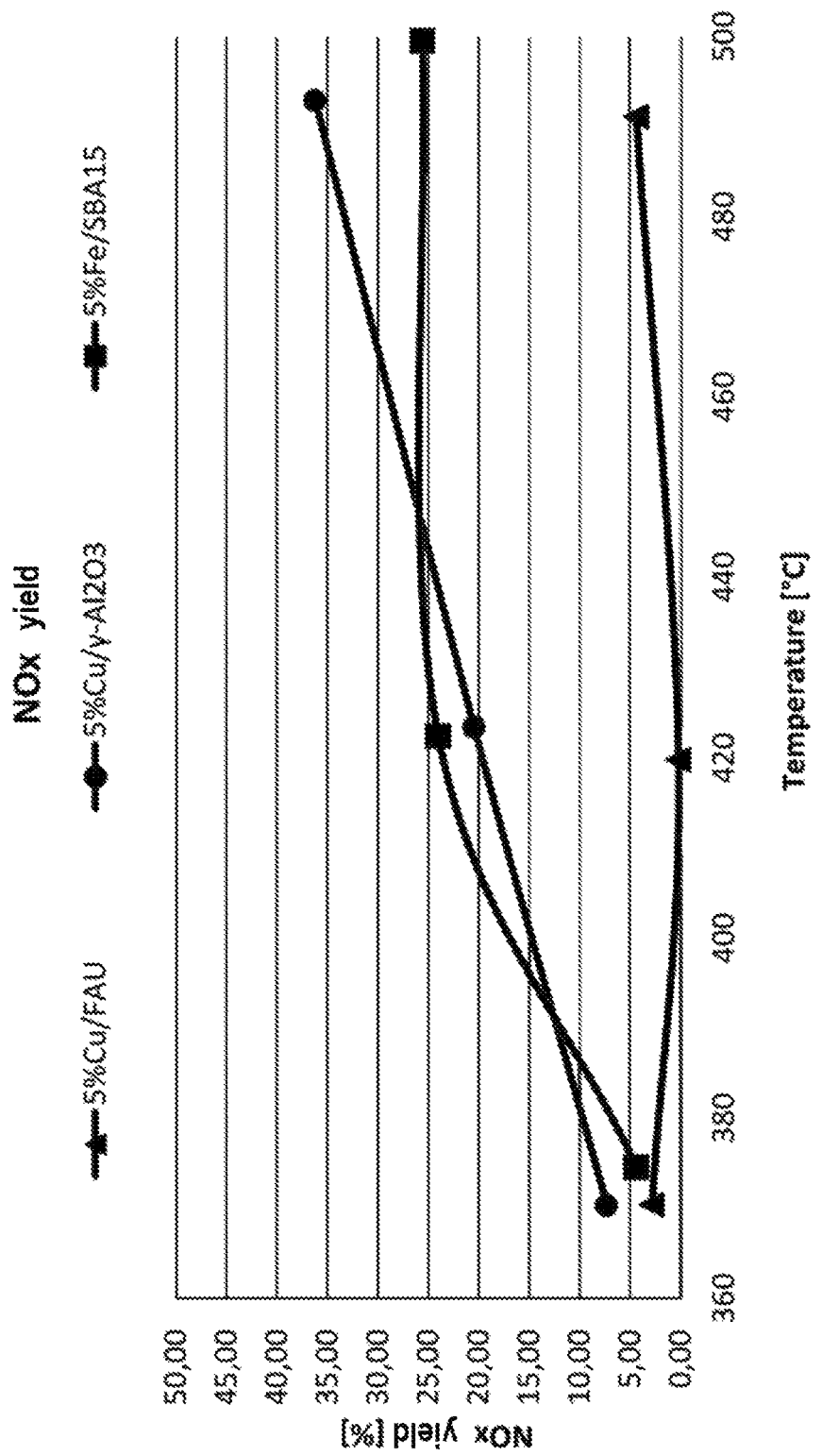
Figure 4:
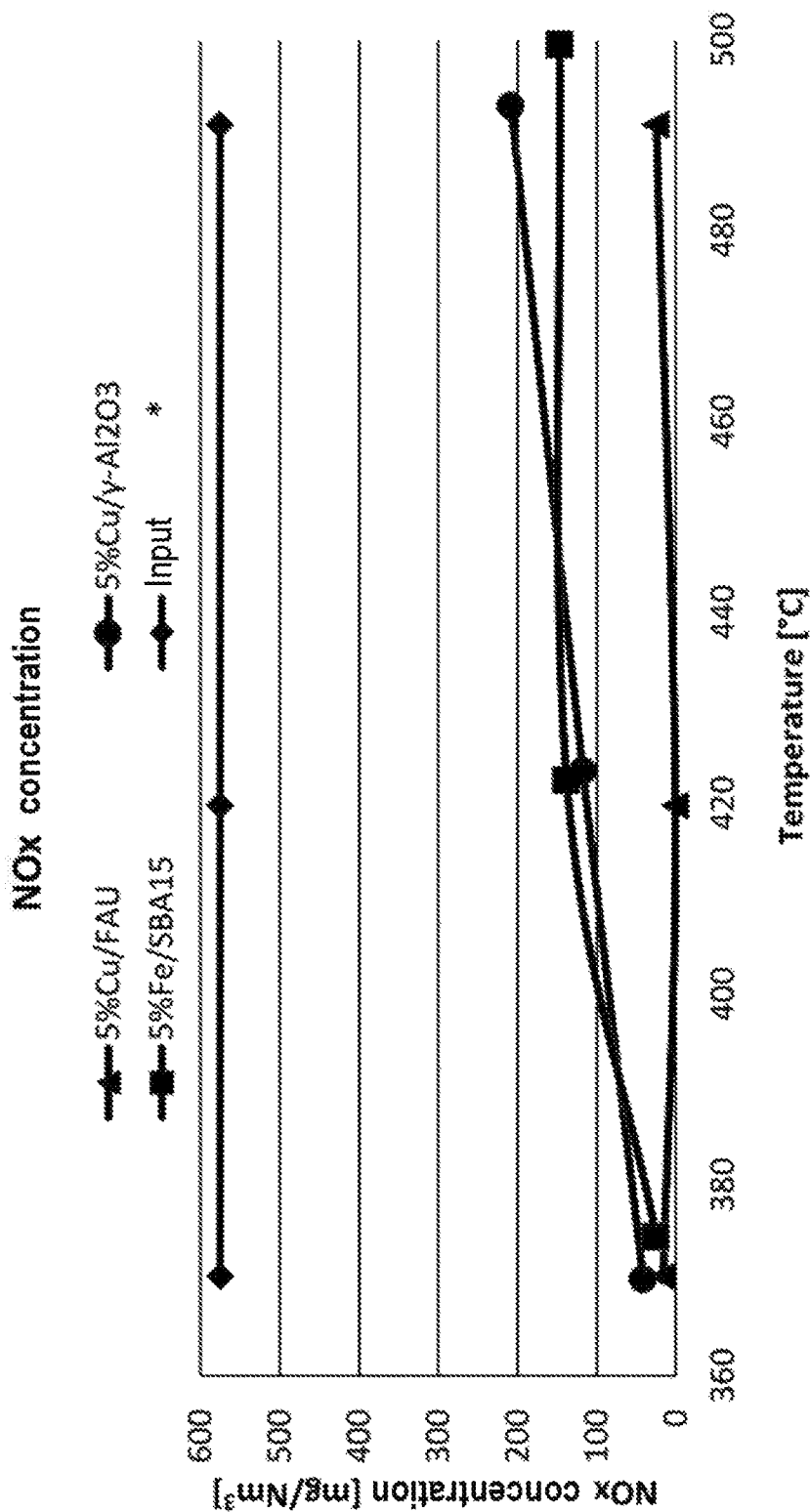

Further features and advantages of the invention will be apparent from the following detailed description with reference to the appended drawings provided purely by way of a non-limiting example, in which:

FIG. 1 is a block diagram of a coffee roasting installation associated with a gaseous effluent treatment system operating according to the process according to this invention; and FIGS. 2 to 4 are comparative diagrams relating to the output or yield of $CO_2$ and $NO_x$ which can indicatively be achieved using a process according to this invention.

DETAILED DESCRIPTION OF THE INVENTION

In FIG. 1, 1 indicates as a whole a roasting or torrefaction apparatus, of a type which is in itself known. In this apparatus there is a roasting chamber which receives a quantity of raw coffee that is to be roasted.

A flow of hot air at a temperature of the order of 500° C., generated for example by means of a burner 2, also of a type which is in itself known, fed with a mixture of air and methane, is also fed to the roasting chamber in apparatus 1.

When in operation gaseous effluents are produced in roasting apparatus 1 and in the embodiment illustrated in FIG. 1 they pass to a cyclone 3, at a temperature of for example between 150° C. and 250° C.

Cyclone 3 carries out preliminary processing of the gaseous effluents, separating particles of greater inertia from the flow.

On leaving cyclone 3 the gaseous effluents are passed to an oxidative catalytic converter 5 by means of a blower device 4.

On leaving blower 4 the gaseous effluents have a temperature of for example between 100° C. and 200° C.

Conveniently, although not necessarily, before reaching catalytic converter 5 the said gaseous effluents pass into an after-burner 6, advantageously fed with the same combustible mixture as used for burner 2.

When they enter oxidative catalyser 5 the gaseous effluents are therefore at a higher temperature, of for example between 350° C. and 500° C., and preferably between 400° C. and 450° C.

In accordance with this invention one of the following catalysts is advantageously used in catalytic converter 5:

a) a catalyst comprising a porous faujasite support, containing copper nanoparticles in a quantity of substantially between 2% and 7%, and preferably approximately 5% of the total weight of the catalyst;

b) a catalyst comprising a porous γ-alumina support, containing copper nanoparticles in a quantity of substantially between 2% and 7%, and preferably approximately 5% of the total weight of the catalyst; and c) a catalyst comprising a mesoporous zeolite or silica support, containing iron nanoparticles in a quantity of substantially between 2% and 7%, and preferably approximately 5% of the total weight of the catalyst.

Conveniently the said mesoporous zeolite or silica is a SBA 15 (Santa Barbara Amorphous) zeolite.

The copper or iron nanoparticles are conveniently deposited on corresponding supports using the IWI (Incipient Wetting Impregnation) technique.

Simulations and tests performed have demonstrated that the catalysts listed above make it possible to achieve quite high selective oxidation of CO, nitrogen-containing molecules and organic compounds, while at the same time preventing or reducing the oxidation of nitrogen atoms. These catalysts have demonstrated that they produce few nitrogen oxides and virtually no emissions of carbon monoxide, providing almost complete conversion of all the molecules present in the system into $CO_2$, $N_2$ and $H_2O$.

FIGS. 2 to 4 show comparative diagrams illustrating yield of $CO_2$, yield of $NO_x$ and $NO_x$ concentration in relation to the temperature shown on the abscissa for the three catalysts described above, determined in simulation tests carried out by oxidising a "test" mixture of molecules typically developed in the roasting of coffee, and in particular a test mixture having the composition shown in the table below:

| Compound | Concentration |
| --- | --- |
| Carbon monoxide | 450 ppm |
| Pyridine | 280 ppm |
| Methanol | 250 ppm |
| Oxygen | 10% |
| Helium | Remainder |

The graph in FIG. 2 shows how the three catalysts described above provide a high yield in terms of carbon dioxide, more than 70%, over an extended temperature range. The catalyst having the highest performance is the catalyst comprising 5% by weight on a γ-alumina substrate, the yield from it throughout the temperature range from 375° C. to 500° C. being over 60%, reaching 100% above 435° C.

From FIG. 4 it can be seen how the concentration of $NO_x$ forming during the test with the copper-based catalyst on the faujasite support is always below 25 g/Nm³, with a $NO_x$ yield of below 5% (FIG. 3).

The iron-based catalyst on SBA-15 zeolite or silica tends asymptotically to a yield of 25% as temperature increases (FIG. 3).

With regard to the copper-based catalyst on a γ-alumina substrate, it will instead be seen that nitrogen oxides increase with increasing temperature.

Of course, without altering the principle of the invention, embodiments and details of embodiments may be varied extensively in relation to what has been described and illustrated purely by way of a non-limiting example without thereby going beyond the scope of the invention as defined in the appended claims.

The invention claimed is:

1. A method for processing the gaseous effluents developed in a coffee roasting installation (1), wherein said effluents are conveyed through an oxidising catalytic converter (5),
and wherein in said catalytic converter use is made of a catalyst comprising a mesoporous silica support, consisting of iron nanoparticles in an amount comprised between 2% and 7% of the total weight of the catalyst.

2. The method according to claim 1, wherein said mesoporous silica is an SBA-15 silica.

3. The method according to claim 1, wherein before being admitted to the catalytic converter said gaseous effluents are heated to a temperature comprised between 350° C. and 500° C.

4. The method according to claim 1, wherein said iron nanoparticles are provided in an amount equal to 5% of the total weight of the catalyst.

5. The method according to claim 1, wherein before being admitted to the catalytic converter said gaseous effluents are heated to a temperature comprised between 400° C. and 450° C.

6. The method according to claim 1, wherein said iron nanoparticles are deposited on said supports with the Incipient Wetting Impregnation (IWI) technique.

7. A method for processing the gaseous effluents developed in a coffee roasting installation (1), wherein said effluents are conveyed through an oxidising catalytic converter (5) and wherein in said catalytic converter (5) use is made of a catalyst comprising a porous γ-alumina support consisting of nanoparticles of copper in an amount comprised between 2% and 7% of the total weight of the catalyst.

8. The method according to claim 7, wherein before being admitted to the catalytic converter (5) said gaseous effluents are heated to a temperature comprised between 350° C. and 500° C.

9. The method according to claim 7, wherein said nanoparticles of copper are provided in an amount equal to 5% of the total weight of the catalyst.

10. The method according to claim 7, wherein before being admitted to the catalytic converter said gaseous effluents are heated to a temperature comprised between 400° C. and 450° C.

11. The method according to claim 7, wherein said nanoparticles of copper are deposited on said supports with the Incipient Wetting Impregnation (IWI) technique.

\* \* \* \* \*